Oct. 26, 1965

G. J. KENNEDY 3,214,613

ELECTRICAL CONTROL SYSTEM FOR A TELEVISION RECEIVER

Filed June 14, 1961

INVENTOR.
GILBERT J. KENNEDY

BY [signature]

ATTORNEY

United States Patent Office 3,214,613

Patented Oct. 26, 1965

3,214,613

ELECTRICAL CONTROL SYSTEM FOR A TELEVISION RECEIVER

Gilbert J. Kennedy, Jenkintown, Pa., assignor, by mesne assignments, to Philco Corporation, Philadelphia, Pa., a corporation of Delaware Filed June 14, 1961, Ser. No. 117,026
1 Claim. (Cl. 307—141.4)

Figure 1:
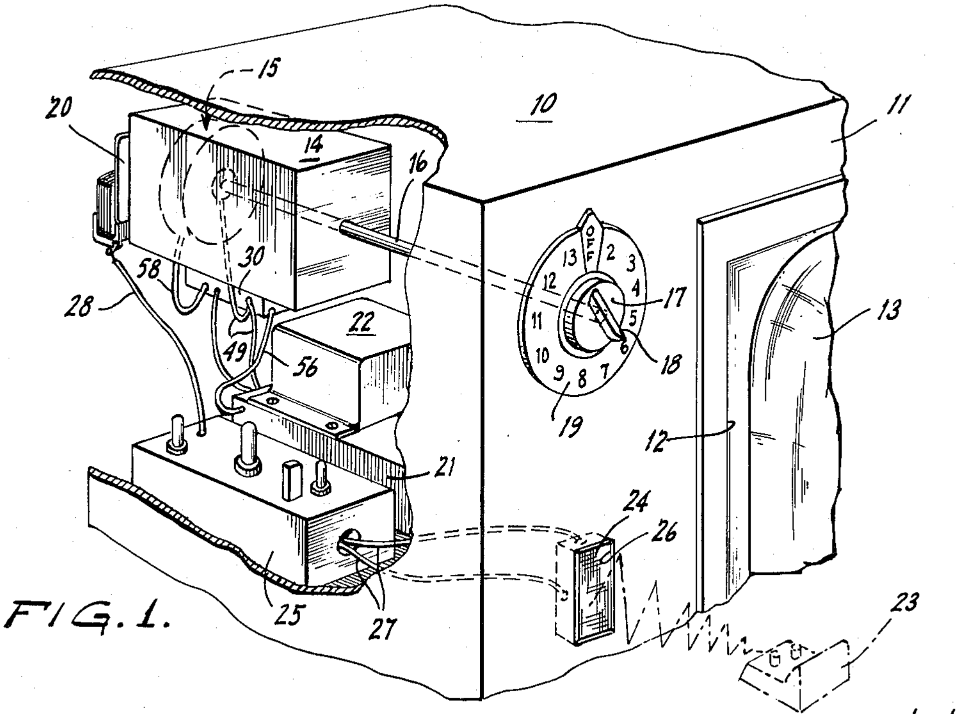

This invention relates to electrical systems and more particularly to systems incorporating thermostatic switch means for controlling deenergization of electrical circuits by delaying the break of current for a predetermined length of time after a circuit control device has been moved to an "off" position. Although suitable for use with various electrical apparatus, the arrangement of the invention has special advantages when incorporated in a control system of the kind employed to effect remote adjustment in a television receiver, and will be shown and described in connection with such a system.

According to customary practice, it is desirable, in a remote control system of the kind mentioned, to employ a station selector or tuner provided with a rotatable switch mechanism adapted for sequential movement through successive tuning positions to effect selection of desired station channels. Such switch mechanism is also employed to shut off the operation of the television receiver and, in this respect, is subject to objections and drawbacks which arise principally from the fact that the switching control arrangement, when passing through "off" position, deenergizes the power supply. As a result, all functions of the receiver cease during the time the switching mechanism leaves a channel position located to one side of "off" position and reaches the channel position located on the other side of "off" position. Accordingly, during that time, an objectionable complete collapse of the picture and sound reproduction occurs, and an undesirable sudden resurgence of power accompanied by eruption of sound and picture reproduction takes place. Moreover, shut-off of power followed immediately by sudden resurgence thereof has deleterious effects on the electronic circuitry and often results in premature burning of circuit components.

It is therefore a primary object of this invention to overcome these objectionable and undesirable features. To that end the invention provides novel means which, when the tuning control mechanism reaches an "off" position, operates to delay the shut-off of the receiver. In this manner, the receiver is maintained for a predetermined length of time in normal operating condition even if there should be a dwell at "off" position in the course of transitional movement from the channel on one side of said positions to the channel on the other side of said position.

Another and more specific object of the invention is to provide a delay switch which, although characterized by simple and inexpensive characteristics, reliably attains desired control of instrumentalities in circuit therewith.

It is also a characteristic feature of the invention to provide delay switching means constructed in a manner which positively insures against operational variations due to extraneous or uncontrollable causes, such as mechanical vibrations and transient electrical conditions.

Other features of the invention have to do with the provision of a novel thermally actuatable delay switching system which can be readily and economically incorporated in television receiver apparatus without requiring material changes in the customary construction of the latter.

Toward achievement of these objectives and advantages, the invention employs a novel combination of main and auxiliary circuits, the auxiliary circuit including thermostatic means adapted under one condition of operation to effect and maintain circuit-making engagement between companion contact elements, and further adapted under another condition of operation to effect delayed circuit-breaking disengagement of the contact elements. In a preferred embodiment, the thermostatic means comprises a pair of thermally responsive members which are operatively associated with the switching mechanism of a television tuner and which cooperate to provide sufficient delay in a switching-off operation to permit manipulation of the tuner control through "off" position without deenergizing the television picture and sound reproducing circuits. One of the thermally responsive members carries a contact-making element and is movable to and from circuit making and breaking positions, whereas the other of said members serves as a latch for the contact-carrying member and is movable to and from latching and unlatching positions.

Figure 2:
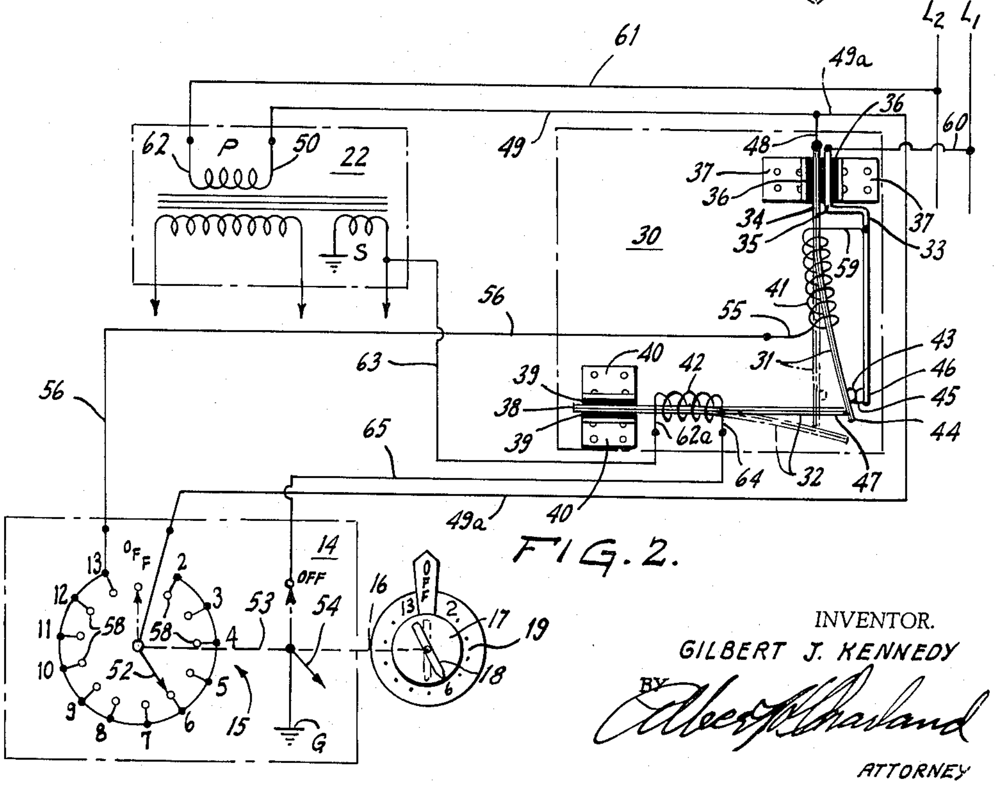

The full nature of the invention and the above-mentioned, as well as other objects and advantages will be more fully understood from the following description based on the accompanying drawing, in which:

FIGURE 1 is a perspective view of a portion of a television receiver, parts of the cabinet walls being broken away to show cooperative components of a control arrangement incorporating the invention; and FIGURE 2 is a schematic view diagrammatically illustrating the preferred electro-mechanical system of the control arrangement shown in FIGURE 1.

Having more particular reference to the drawing, the television receiver illustrated in FIGURE 1 includes a cabinet 10 of conventional design provided with a front wall 11 supplied with the usual viewing opening 12 for accommodating the picture tube screen 13. The structural and electrical components of the television receiver can be and preferably are conventional, and need not be described in detail.

In the illustrated embodiment, a channel selector or tuner 14 is mounted according to usual practice within the cabinet 10. This channel selector or tuner can be and preferably is of the conventional variety in which a rotary switch 15 is operatively connected with a tuning shaft 16 is to be thereby advanced step-by-step through successive tuning positions to effect station channel selection. As shown, the selector or tuner shaft 16 extends forwardly through the front wall 11 of the cabinet and is provided with an outer knob 17 having a pointer 18. This pointer cooperates with an appropriate channel designating scale 19 on said front wall of the cabinet to provide visual indication of the selected channel. As is usual, the scale 19 displays the customary channel position "2 through 13" with an "off" position between the channel "2" and the channel "13" positions.

As viewed in FIGURE 1, the tuner shaft 16 which can be manually rotated either clockwise or counterclockwise by means of the knob 17, is further adapted to be power-driven for rotation in clockwise direction through actuation of a reduction gear and electric motor unit 20. This unit is conveniently carried by the tuner housing and is enclosed in the receiver cabinet 10. The receiver cabinet also encloses a main chassis 21 for the conventional video and audio circuits which, as is customary, include a power transformer 22. These conventional circuits are coupled to the tuned circuits of the channel selector or tuner as well as to the power supply circuit, the coupling between the various circuits being accomplished in accordance with usual practice.

As seen in the drawing, the receiver is adapted for adjustment to a desired television channel by function of a remote control system. The control system can be any one of several suitable known varieties and, in the illustrated embodiment, is the familiar kind which operates in response to remotely emitted supersonic wave energy generated through activation of a portable manually operable transmitter device represented at 23. A system of this kind may include an auxiliary receiver which consists of a sound pickup unit 24 and an auxiliary chassis 25, said unit and chassis being enclosed in the cabinet 10. The sound pickup unit 24 which is preferably mounted within the cabinet to register with an opening 26 in the front wall 11, is electrically coupled by means of conductors 27 to the circuit of the auxiliary chassis 25 which is also electrically coupled by means of a cable 28 to the aforesaid reduction gear and electric motor unit 20.

With the system described above, the pickup unit 24 receives remotely emitted sound waves which are transmitted to the circuitry of the axiliary receiver chassis 25 and are thereby converted into electrical energy. This energy is supplied to the driving motor unit 20 which advances the channel selector switch from one station channel position to the next station channel position. From FIGURE 2 of the drawing, it will be apparent that continued step-by-step actuation of the selector switch through successive channel tuning positions, will eventually bring said switch to "off" position. In this latter position, the selector switch would normally open the receiver circuits so that all electrical functions of the receiver would be terminated thus bringing about the aforementioned objectionable and undesirable conditions, if it should be desired to switch the receiver on again immediately or shortly after such termination of its functions. To obviate these conditions, the system of the present invention incorporates a thermal delay switch assembly, designated in its entirety, by the reference character 30.

In the preferred embodiment and as is illustrated in FIGURE 2, the delay switch assembly 30 includes a pair of thermally actuatable elements in the form of elongated bimetallic strips 31 and 32. The first bimetallic strip 31 lies adjacent and generally parallel to an extended conductive arm 33, one end portion 34 of said strip 31 and one end portion 35 of said arm 33 being anchored between blocks 36 of nonconductive material by means of fixed clamping brackets 37. The second bimetallic strip 32 is anchored, at one end portion 38 thereof, between blocks 39 of non-conductive material by means of clamping brackets 40. This second bimetallic strip 32 extends in a direction generally perpendicular to the first bimetallic strip 31 and is adapted to releasably latch said first strip in a manner and for the purpose to be presently described.

As seen in FIGURE 2, electrical resistance elements or heating coils 41 and 42 are associated with the bimetallic strips 31 and 32, respectively. The heating coil 41, when energized, applies heat to the bimetallic strip 31 thereby causing the latter to flex from normal or relaxed position (shown in broken lines) to a deflected or stressed position (shown in full lines). In this latter position, an electrical contact 43 carried by free end portion 44 of the bimetallic strip 31 is brought thereby into circuit-making engagement with an electrical contact 45 on free end portion 46 of the conductive arm 33. In accordance with the invention the bimetallic strip 31 is adapted, under certain conditions of operation, to remain in the aforesaid deflected position to maintain contacts 43 and 45 in circuit-making engagement even after the heating coil 41 has been deenergized and said strip 31 normally tends to assume its normal or circuit-breaking position.

For that purpose the second bimetallic strip 32 has a free end portion 47 which overlaps and abuts the free end portion 44 of the first bimetallic strip 31, when said second strip 32 is in normal position, as shown in full lines in FIGURE 2. Thus the bimetallic strip 31 is latched or maintained in contact-making position as long as said strip 32 remains in its normal position. However, when the heating coil 42 is energized and applies heat to said strip 32, the latter flexes from its normal position to a deflected position and thus releases the first bimetallic strip 31 which then springs back to its normal or circuit-breaking position aforesaid.

As shown in the drawing, the thermal switch assembly 30 is electrically coupled to the receiver and, in the illustrated circuit, a conductor 48 connects the first bimetallic strip 31 to conductor portions 49–**49*a*. These conductor portions electrically link one end 50 of the primary winding P of the power transformer 22 to a main movable switch arm 52 incorporated in the channel selector device 14 and mechanically connected, as represented at 53, to an auxiliary movable switch arm 54 also incorporated in said selector device. The heating coil 41 associated with the bimetallic strip 31 has one of its ends 55 connected through a conductor 56 to multiple switch contacts 58. These contacts correspond to the channel positions indicated on the scale associated with the pointer 18 on the actuator knob 17 of the tuner shaft 16 which actuates the mechanically linked switch arms 52 and 54. The other end 59 of the heating coil 41 is tapped to the contact-carrying arm 33 which is connected by means of a conductor 60 to one side $L_1$ of an electrical power source, the other side $L_2$ of which is connected through a conductor 61 to the other end 62** of the transformer primary winding P.

From the foregoing description it will be understood that the heating coil 41 is energized by current flowing therethrough from one to the other side of the power source through the conductor 60, conductive arm 33, coil portions 59 and 55, conductor 56, one of switch contacts 58, switch arm 52, conductor portions **49*a* and 49, transformer primary winding P and conductor 61. As hereinbefore noted energization of the heating coil 41 causes the bimetallic strip 31 to flex and establish electrical connection between contacts 43 and 45. When this condition occurs, the current normally follows the path of least resistance through the conductor 60, arm 33, contacts 43 and 45, bimetallic strip 31, conductor 48, conductor portion 49, transformer primary P and conductor 61. Thus, the resistance heating coil 41 is bypassed and deenergized so that the bimetallic strip 31 cools and tends to return to its normal circuit-breaking position. However, movement of said strip 31 to said normal position is prevented so long as the second bimetallic strip 32 continues to latch said strip 31 in its deflected condition, that is until energization of the heating coil 42 causes said second bimetallic strip 32 to flex so as to release the strip 31**.

In the illustrated circuit, one end **62*a* of the coil 42 is connected through a conductor 63 to low voltage secondary winding S of the transformer 22, the other end 64 of said coil 42 being connected to ground G through a conductor 65 and through the auxiliary switch arm 54 when in "off" position represented in FIGURE 2. Under this latter condition low voltage current flows through the coil 42 which operates in such a manner that heating of the bimetallic strip 32 is sufficiently slow to provide for a predetermined delay in releasing said bimetallic strip 31 to circuit-breaking position. The length of time elapsing before occurrence of this function is sufficient to insure continued energization of the receiver when it is desired to move from "off" position to a channel-selecting position within a reasonable time after the rotary switch attains the "off" position. When the selector switch remains in "off" position beyond the preselected time, then the bimetallic strip 32** is heated sufficiently to effect opening of the receiver circuit in the manner stated above.

In accordance with the invention opening of the receiver circuit occurs when the components have cooled sufficiently so that re-energization of the receiver, when the station selector switch is moved from "off" position to one of the channel-selecting positions, is unlikely to have detrimental effects. As will appear from FIGURE 2, placement of the selector switch from "off" position to one of the channel-selecting positions results in a flow of current through the coil 41 which then heats the strip 31 to effect energization of the receiver by closing contacts 43 and 45 in the manner aforesaid. Of course, flexing motion of the strip 31 frees the cooled bimetallic strip 32 and allows it to move automatically to its normal or latching position.

From the foregoing description it will be appreciated that the thermostatic switch assembly of the invention not only provides simplified means operable to delay shut-off of the receiver when the tuning control reaches "off" position in moving to and from channel selecting positions on opposite sides of said "off" position, but further provides reliable means which positively insures against damage to electronic components of the receiver due to sudden resurgence of power as a result of switching operation from "on" through "off" to "on" positions in close succession.

Although a preferred embodiment has been shown and described, it will be appreciated that the invention is not limited to specific structures of this embodiment but embraces such changes and variations as come within the scope of the subjoined claim.

What I claim is:

A thermal delay switch arrangement for delaying deenergization of electrical apparatus including a power transformer having a primary winding and secondary winding means, said switch arrangement comprising a pair of electrical contacts disposed in series electrical circuit with said primary winding, a first thermally actuatable element disposed to actuate one of said contacts and movable to place the latter in and out of circuit-making engagement with the other of said contacts whereby said primary winding may be energized or deenergized, a second thermally actuatable element normally disposed to engage said first element to maintain the same in position for engagement of said contacts, said second element being movable to a position to release said first element for disengagement of said contacts, electrical switch means in series with said primary winding and said contacts and placeable in "on" and "off" positions to control energization of said primary winding, first electrical heating means operable to heat said first element in response to placement of said switch means in "on" position, and second electrical heating means energizable by said secondary winding operable to heat said second thermally actuatable element in response to movement of said switch means to "off" position, said secondary winding means energizing said second electrical heating means to move said second element to its recited position for releasing said first element so that the contacts will be opened and deenergize said primary winding.

References Cited by the Examiner

UNITED STATES PATENTS 3,054,875 9/62 Blain ---------------- 200—122

FOREIGN PATENTS 398,341 9/33 Great Britain.

LLOYD McCOLLUM, *Primary Examiner.*

BERNARD A. GILHEANY, *Examiner.*